US011932353B2

(12) United States Patent

Silberman et al.

(10) Patent No.: US 11,932,353 B2
(45) Date of Patent: Mar. 19, 2024

(54) HYDRAULIC PISTON SPUD POLE

(71) Applicant: Cyril J. Silberman, Miami Beach, FL (US)

(72) Inventors: Cyril J. Silberman, Miami Beach, FL (US); Even Semrud, Duluth, MN (US); Jesse M. Muckerman, Miami Beach, FL (US); Christian E. Cabassa, Miami, FL (US)

(73) Assignee: Cyril J. Silberman, Miami Beach, FL (US)

( * ) Notice: Subject to any disclaimer, the term of this patent is extended or adjusted under 35 U.S.C. 154(b) by 385 days.

(21) Appl. No.: 17/531,395

(22) Filed: Nov. 19, 2021

(65) Prior Publication Data

US 2023/0159137 A1 May 25, 2023

(51) Int. Cl.
*B63B 21/30* (2006.01)
*B63B 21/26* (2006.01)
*F15B 15/14* (2006.01)

(52) U.S. Cl.
CPC .............. *B63B 21/30* (2013.01); *B63B 21/26* (2013.01); *F15B 15/14* (2013.01)

(58) Field of Classification Search
CPC .......... B63B 21/30; B63B 21/26; F15B 15/14
See application file for complete search history.

(56) References Cited

U.S. PATENT DOCUMENTS

| | | | | |
|---|---|---|---|---|
| 3,683,521 | A | 8/1972 | Sloan et al. | |
| 4,399,623 | A | 8/1983 | Neumann | |
| 5,145,425 | A | 9/1992 | Little | |
| 5,305,703 | A * | 4/1994 | Korsgaard | B63B 22/023 114/230.1 |
| 6,220,197 | B1 | 4/2001 | Pohlman | |
| 10,287,748 | B1 | 5/2019 | Wetta | |
| 2011/0107952 | A1 * | 5/2011 | Nicholson, IV | B63B 21/26 114/230.13 |

* cited by examiner

*Primary Examiner* — Stephen P Avila
(74) *Attorney, Agent, or Firm* — Thomas J. Brindisi

(57) ABSTRACT

A hydraulic piston spud pole for anchoring a vessel may comprise an elongate sleeve having a top, a hydraulic inlet, and a bottom terminating in a bottom aperture, a portion of the elongate sleeve being formed to contain a hydraulic column; a spud pole having a piston vertically-movably seated within the elongate sleeve; and a pump assembly connected to the hydraulic inlet that is preferably activated by a controller to lift or drop the spud pole. The elongate sleeve may comprise a vertically-extending inner surface and a sleeve bearing, and the spud pole may comprise a vertically-extending outer surface configured to fit closely against the sleeve bearing while the piston fits closely against the elongate sleeve's vertically-extending inner surface. The hydraulic column may be defined between the vertically-extending outer surface of the spud pole, the vertically-extending inner surface of the elongate sleeve, the piston, and the sleeve bearing.

25 Claims, 15 Drawing Sheets

SECTION A-A

SECTION A-A

SECTION B-B

SECTION B-B

HYDRAULIC PISTON SPUD POLE

FIELD OF THE DISCLOSURE

The present invention relates to apparatuses used in the anchoring of floating vessels, and more specifically to spud poles used for anchoring floating vessels.

BACKGROUND

Anchoring a vessel (particularly a larger vessel) in shallow water using a conventional anchor and chain can require substantial time and attention. Spud poles are well-known for anchoring in relatively shallow water, typically on small vessels, and also in "walking" dredging apparatuses, but they are not generally amenable to vessels such as motor yachts wherein aesthetics and discreetness and ease of operation are concerns, as their retraction machinery is unsightly, cumbersome, noisy, and would consume deck space.

Also, onboard power generation is becoming increasingly prevalent on marine vessels, and some vessels can be equipped with means for generating electricity by externally-forced rotation of a drive propellor(s) or the like. Water currents that could provide this forced rotation may be difficult to access efficiently, however, due to the difficulty of holding the vessel's propeller(s) amidst and in line with a current. For example, strong currents often prevail in channels and other locations where holding position on an anchor rode can be fraught and may require the maintaining of corrective propulsion.

SUMMARY

A hydraulic piston spud pole according to the present invention can be relatively safe and easy to deploy and retrieve, and among other potential benefits it may allow a vessel to anchor more easily and usefully in tight quarters than could be done with a conventional weighted anchor on a long (e.g., chain) rode. A hydraulic piston spud pole for anchoring a vessel according to the present invention may comprise an elongate sleeve configured to be affixed to a vessel and having a top, a hydraulic inlet, and a bottom terminating in a bottom aperture, a portion of the elongate sleeve including the hydraulic inlet being formed to contain a hydraulic column; a spud pole having a piston and vertically-movably seated within the elongate sleeve; and a pump assembly comprising a pump, a pump inlet line connecting the pump to a source of water, and a pump outlet line connecting the pump to the hydraulic inlet. The pump assembly is preferably activated by a controller in order to lift or drop the spud pole as desired.

In some embodiments, the hydraulic piston spud pole's elongate sleeve may comprise a vertically-extending inner surface of a first inner diameter and provided with a sleeve bearing having a sleeve bearing inner surface of a second inner diameter narrower than the first inner diameter, and the spud pole may comprise a vertically-extending outer surface configured to fit closely against the sleeve bearing inner surface with the piston having a piston outer surface configured to fit closely against the elongate sleeve's vertically-extending inner surface. In some such embodiments, the hydraulic column may be defined between the vertically-extending outer surface of the spud pole, the vertically-extending inner surface of the elongate sleeve, the piston, and the sleeve bearing.

In some embodiments, the hydraulic piston spud pole is integrally mounted to the vessel and the spud pole and the elongate sleeve are configured so that the spud pole can rotate within the elongate sleeve when the vessel is anchored via the hydraulic piston spud pole, which may allow the vessel to "weathervane" with a water current. In such embodiments, the hydraulic piston spud pole preferably may be mounted forward and amidships such as through the vessel's forward deck.

The hydraulic piston spud pole preferably may also comprise a lock configured to engage the spud pole as desired to secure it against vertical movement, and may also comprise means for receiving and routing away from the vessel overflow escaped out of the hydraulic column, such as a hydraulic overflow outlet and a plumbing and breather channel and/or other suitable means such as a sump and/or a discharge pump.

Herein, where a device or system is described as being configured in a certain way, it is meant that it is configured in at least that way; however, it is to be understood that the device or system can also be configured in other ways than those specifically described. Likewise, the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are intended as open-ended. As a result, an apparatus that "comprises," "has," "includes," or "contains" one or more elements possesses those one or more elements, but is not limited to possessing only those elements. The feature or features of one embodiment described herein may be applied to other embodiments, even though not described or illustrated, unless expressly prohibited by this disclosure or the nature of the embodiments.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted) for at least the embodiments shown.

DETAILED DESCRIPTION

Figure 1:
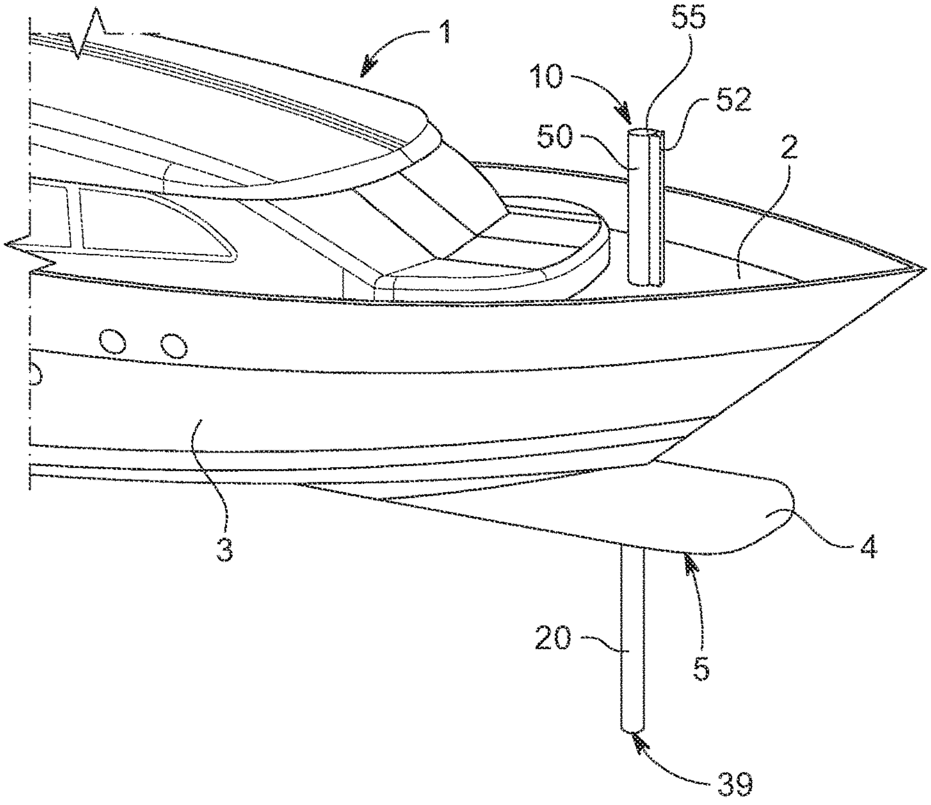
FIG. 1 is a partial perspective view of a vessel provided with a hydraulic piston spud pole in the forward section of the vessel, showing the spud pole deployed downwardly.
Figure 2:
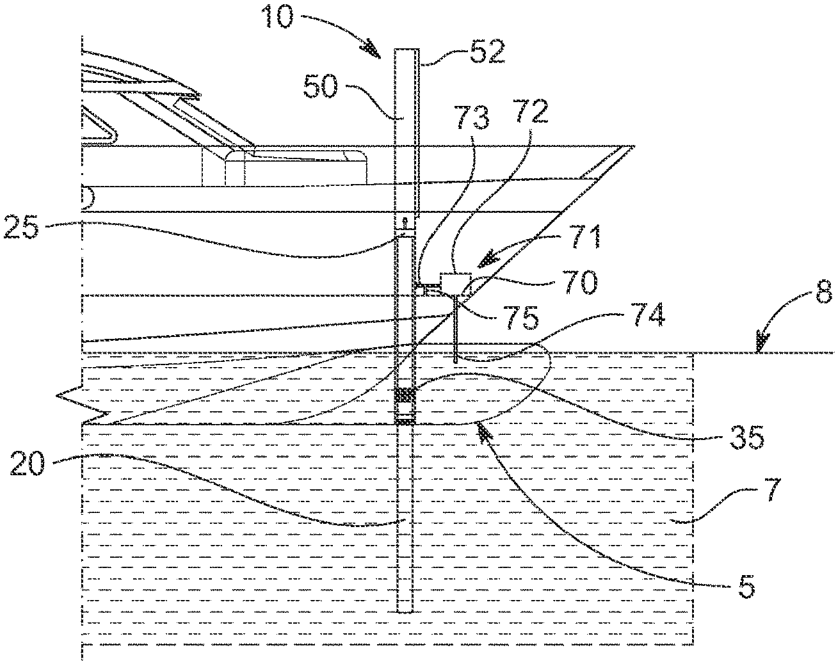
FIG. 2 is a transparent side view corresponding to FIG. 1.

Referring now to the drawings in more detail, a hydraulic piston spud pole 10 according to the present invention may be used advantageously on a variety of vessels, including ones having relatively shallow drafts that can enter into relatively shallow estuaries, anchorages, channels, and the like. In the illustrated embodiment, for example, a 100-foot tri-deck vessel 1 as shown in FIG. 1 and FIG. 2 having a displacement of about 75 tons and a gross tonnage (IMO) of about 250 tons has a keel the deepest extent of which extends about four-and-a-half feet below the waterline 8 (and which in the illustrated vessel 1 includes a hull 3 fitted with a bulb 4 extending about three-and-a-half feet below the waterline 8), with the vessel 1's main propellers (not shown; e.g., shrouded in raised tunnels to minimize draft) preferably projecting somewhat less (e.g., four feet) below the waterline 8.

Figure 10:
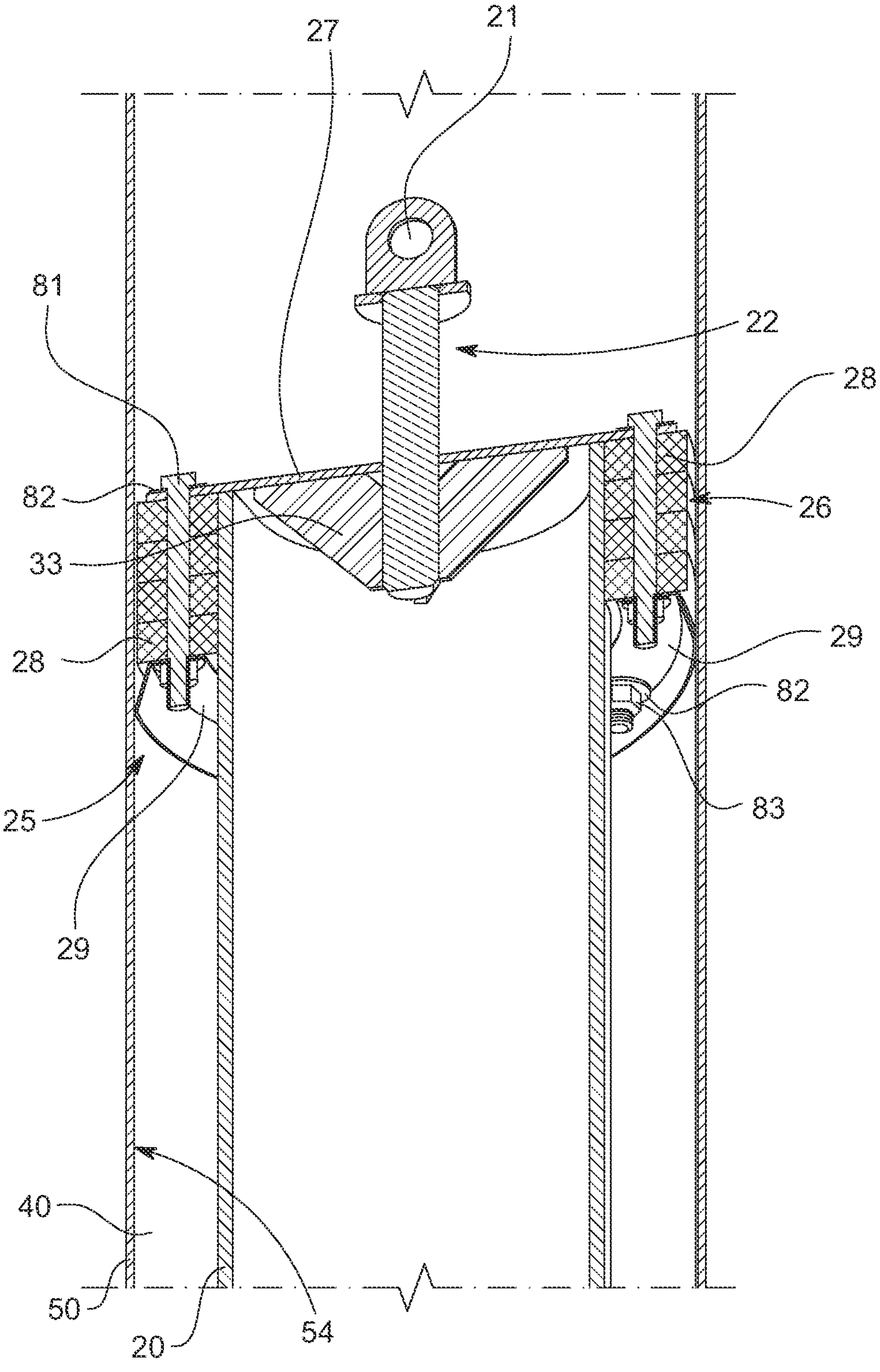
FIG. 10 is a partial cutaway perspective view showing the piston of the spud pole within the elongate sleeve.
Figure 13:
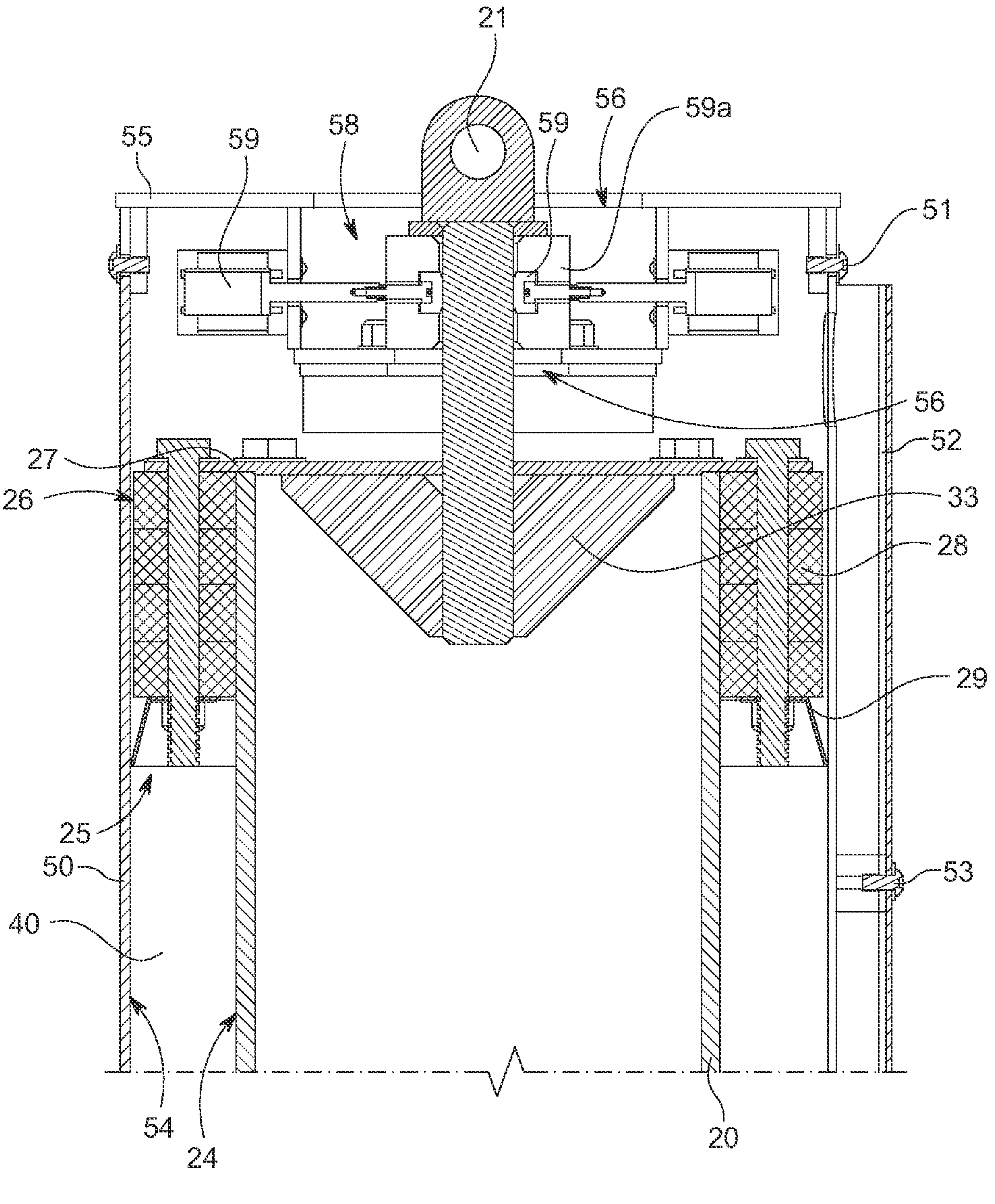
FIG. 13 is a sectional view showing the elongate sleeve's cap and its lock securely engaged with the locking abutment at the top of the spud pole.
Figure 14:
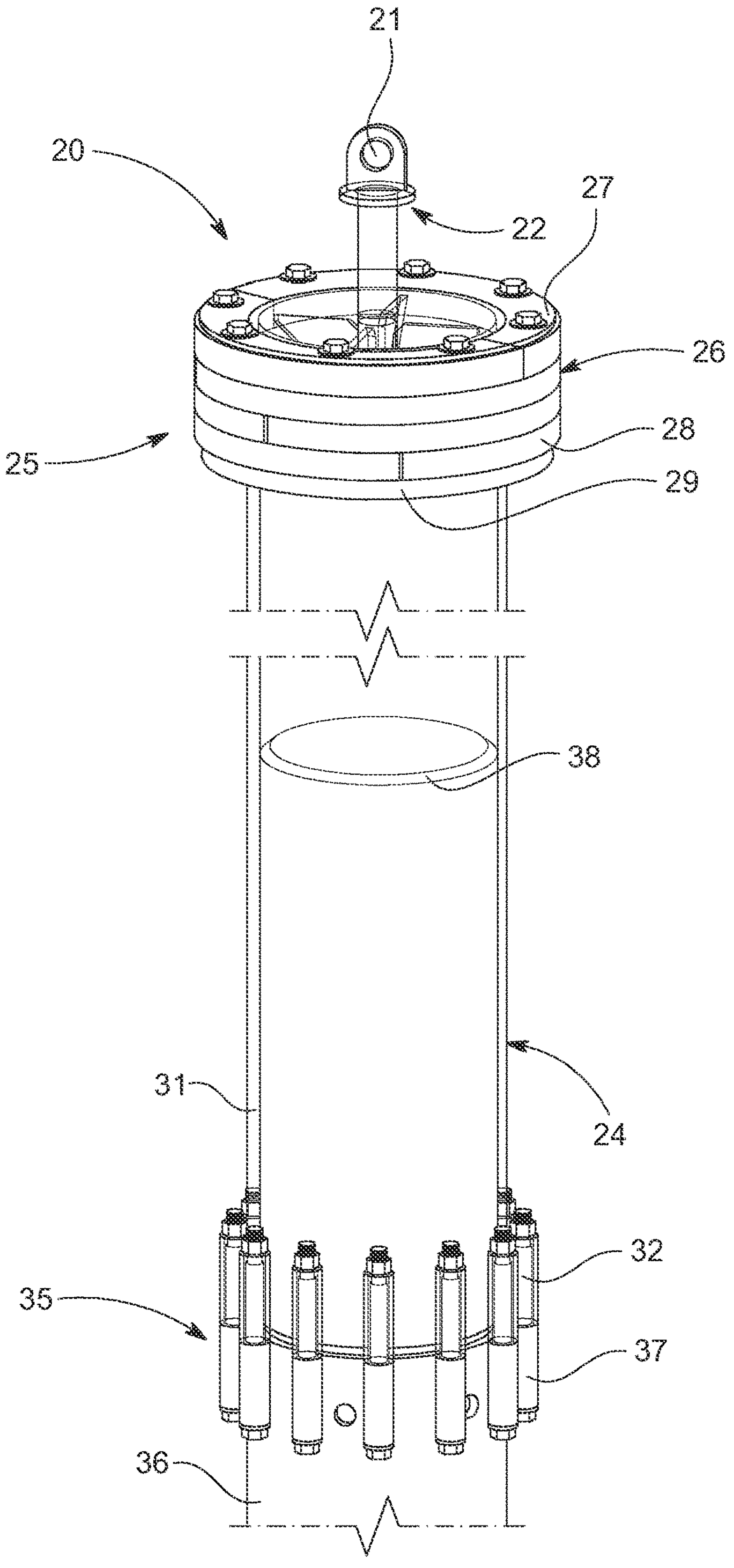
FIG. 14 is a partly-transparent perspective view of the spud pole showing its top and its breakaway joint.
Figure 15:
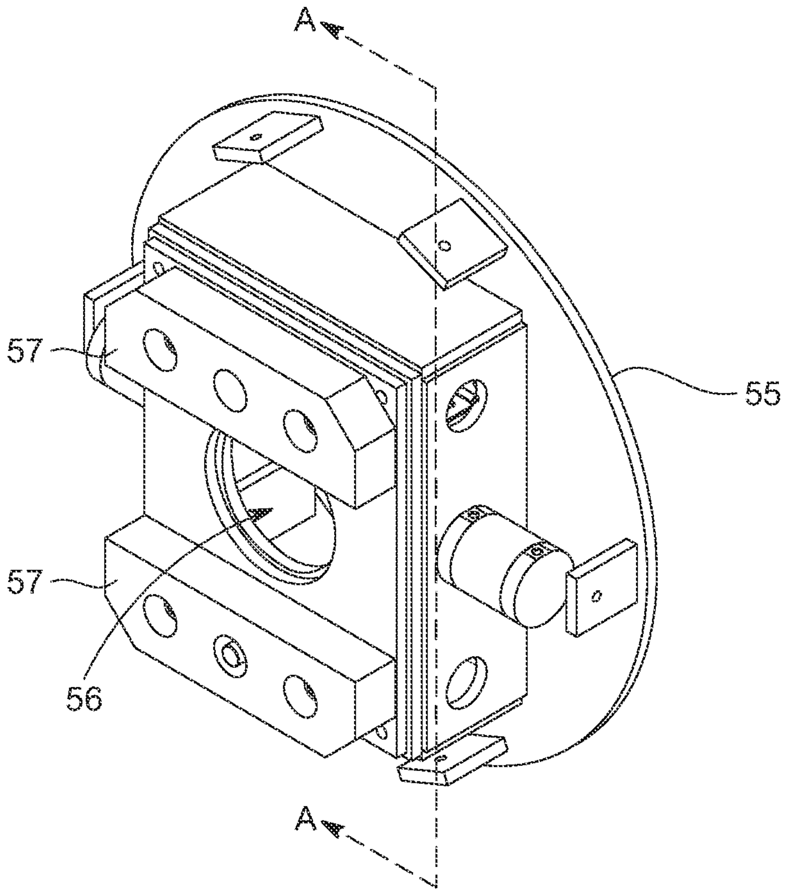
FIG. 15 is a perspective view of the elongate sleeve's cap.
Figure 16:
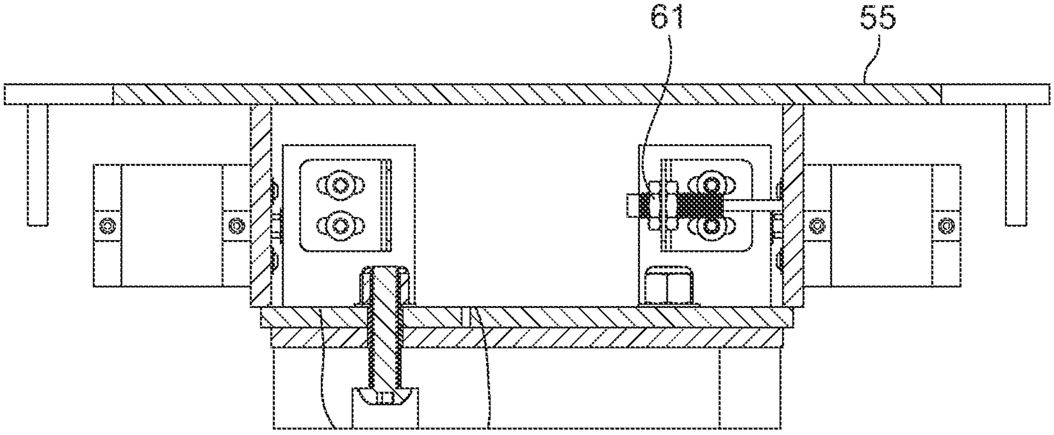
FIG. 16 is a sectional view of the cap taken along lines A-A of FIG. 15.

The hydraulic piston spud pole 10 comprises a spud pole 20, which in the exemplary embodiment may desirably comprise an eighteen-foot section of eight-inch, 316 stainless steel schedule-40 pipe weighing about five-hundred pounds, with a piston 25 including a piston outer surface 26 provided at the top of the spud pole 20; a vertically-extending outer surface 24; and an anchor end face 39 provided at the bottom of the spud pole 20. The piston 25 may comprise, e.g., four pairs of one-inch-thick ultra-high molecular weight polyethylene plate half-rings 28 (e.g., 12.265-inch outer diameter, with an inner diameter preferably chosen to closely fit around the vertically-extending outer surface 24 of the spud pole 20) sandwiched together with a cup seal 29 (e.g., an Allegheny York 12.5-inch outer diameter urethane cup seal, part no. C112500-1250) and secured to a top plate 27 (e.g., quarter-inch thick stainless steel) of the spud pole 20 by bolts 81, washers 82, and nuts 83 (which are preferably made of stainless steel). In the depicted embodiment, the spud pole 20 further comprises a lifting eye 21 and a locking abutment 22 (seen in cross-section in FIG. 10 and FIG. 13) secured through (e.g., threadedly) to a generally conical top plate anchor 33 beneath the top plate 27. The anchor end face 39 optionally may be configured to enhance anchoring to the bottom, for example, with a pointed conical shape (not shown).

Figure 8:
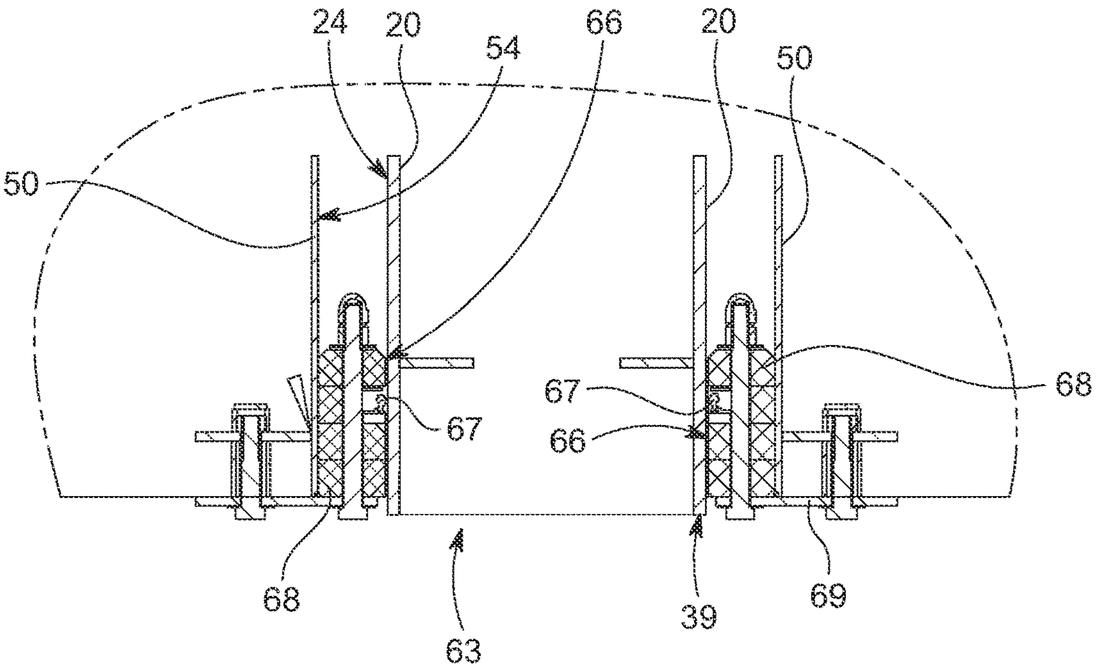
FIG. 8 is a sectional view taken through lines A-A of FIG. 6.

The spud pole 20 is encased in an elongate sleeve 50, which in the depicted embodiment may be a twelve-inch diameter 316 stainless steel schedule 10 pipe integrally mounted in the vessel 1 amidships through the forward deck 2. As depicted, the elongate sleeve 50 may extend substantially above the forward deck 2 and preferably may be configured to provide a support for other structures functionally unrelated to the hydraulic piston spud pole 10, such as a canopy, radar, etc. The elongate sleeve 50 includes a vertically-extending inner surface 54 against which the piston outer surface 26 fits closely (but this fit optionally may be not quite watertight), and a sleeve bearing 65 is provided at the bottom of the elongate sleeve 50, the sleeve bearing inner surface 66 of which fits closely (but this fit optionally may be not quite watertight) around the vertically-extending outer surface 24 of the spud pole 20. The elongate sleeve 50 terminates at its bottom end in a bottom aperture 63 around which the elongate sleeve 50 is preferably hermetically sealed to the bottom 5 of the keel. The sleeve bearing 65 in the illustrated embodiment preferably may comprise, e.g., four one-inch-thick ultra-high molecular weight polyethylene plate rings 68 having an outer diameter of 12.375 inches and an inner diameter of 8.75 inches (with the uppermost ring's upper inner and upper outer perimeters preferably being beveled) and sandwiched together with a sleeve bearing seal 67 (which may comprise, e.g., a solid nitrile seal such as a Timken National Seals product no. 417567) against a sleeve fastening plate 69 (which is in turn fastened to the bottom 5 of the keel, and is made of, e.g., quarter-inch stainless steel) with bolts 81, washers 82, and nuts 83 as seen in FIG. 8.

Figure 4:
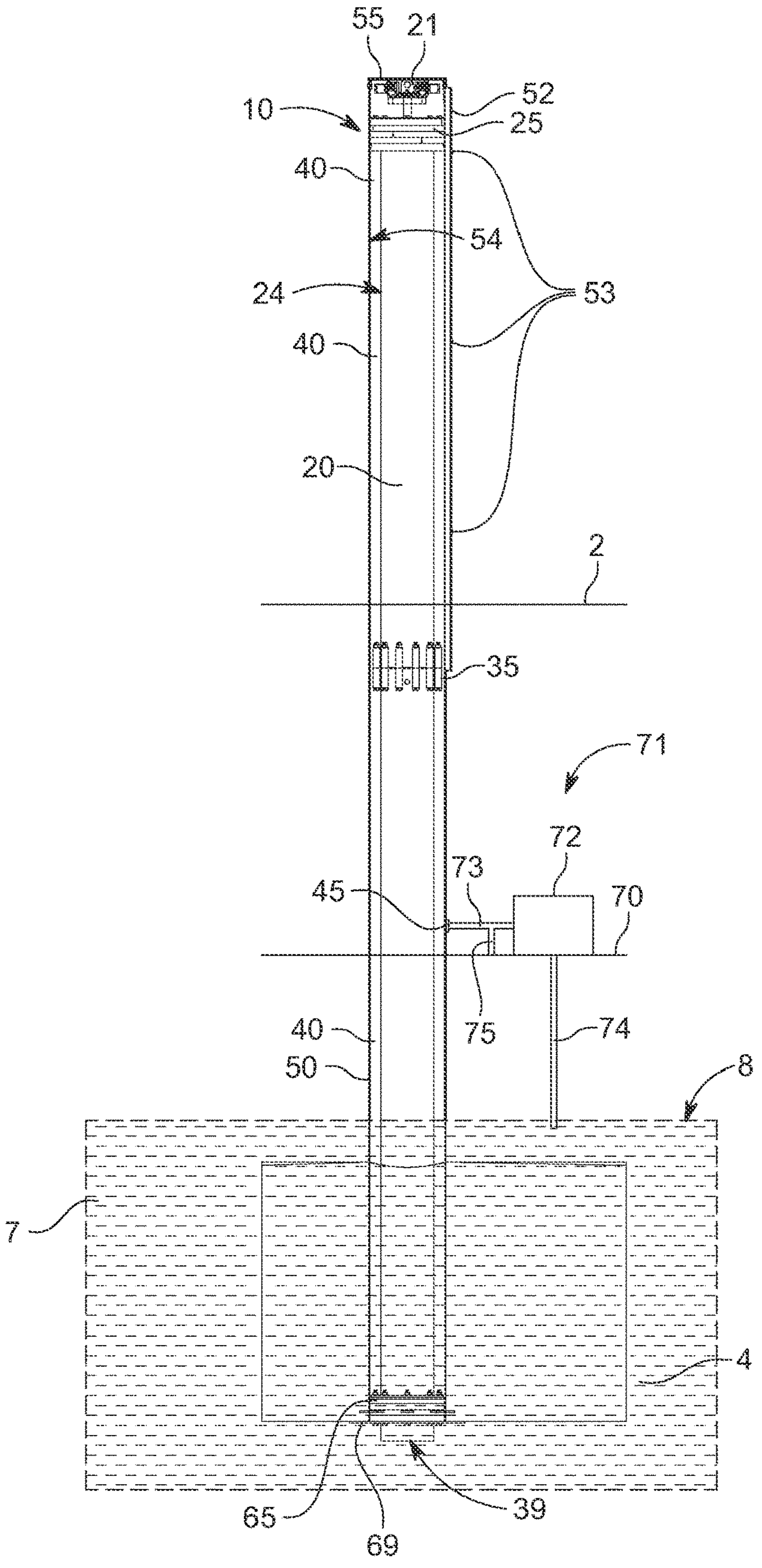
FIG. 4 is a transparent side view corresponding to FIG. 3, with the spud pole nearly fully raised.
Figure 5:
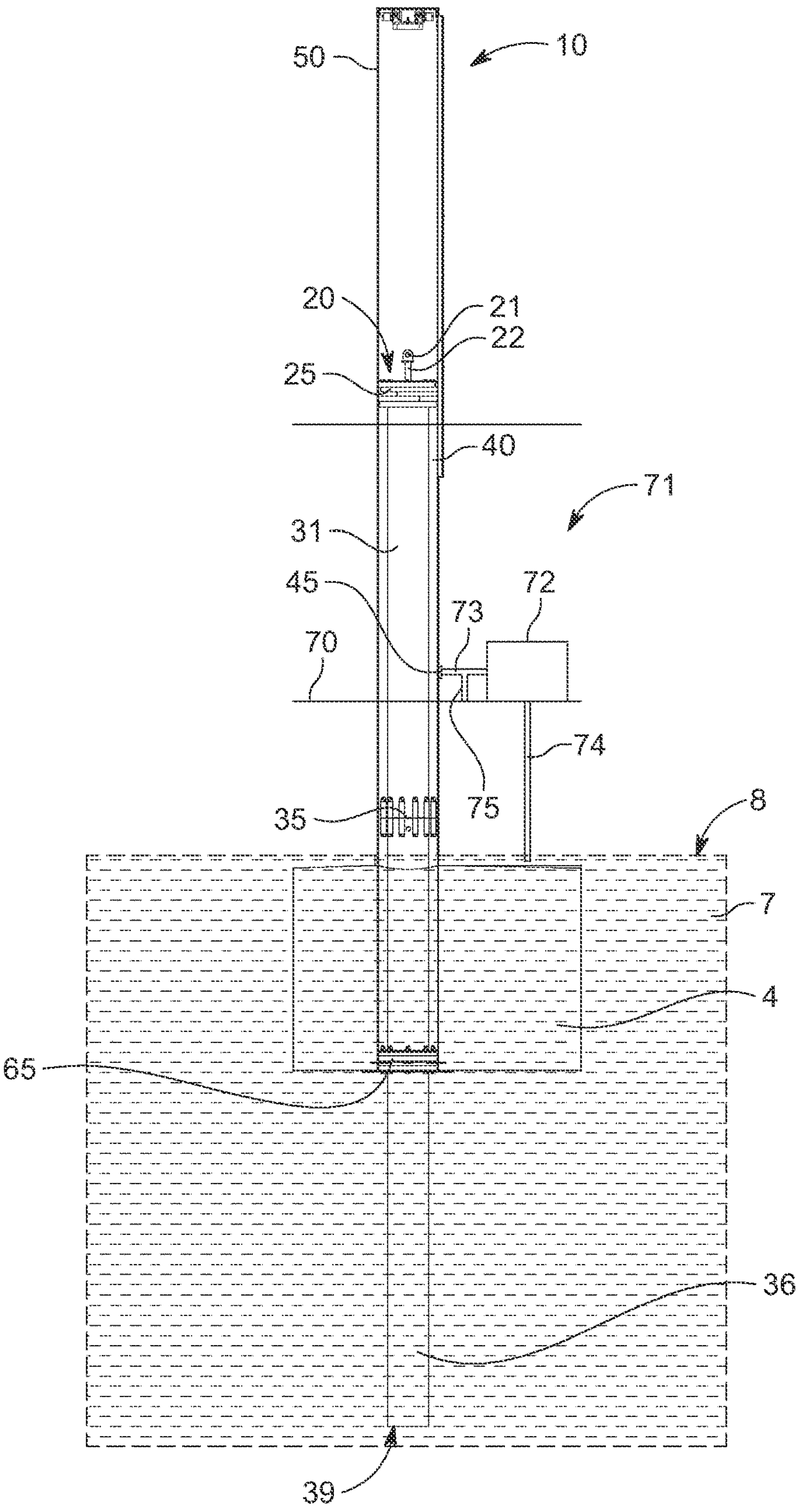
FIG. 5 is a transparent side view corresponding to FIG. 3, with the spud pole deployed.

When the spud pole 20 of the depicted embodiment is dropped to its lowest extent within the elongate sleeve 50, its anchor end face 39 protrudes through the bottom aperture 63 of the elongate sleeve 50 about ten feet below the bottom 5 of the keel, allowing the exemplary vessel 1 to use the hydraulic piston spud pole 10 to anchor in up to about thirteen feet of water. When the spud pole 20 is lifted to its maximum height, the anchor end face 39 is preferably flush with the bottom 5 of the keel (or optionally it could be configured to raise above the bottom 5 of the keel with the bottom aperture 63 coverable by a movable closure, not shown). The spud pole 20 is seen just below its uppermost position in FIG. 4, and extended substantially (but not maximally) down in FIG. 5.

The elongate sleeve 50 preferably is covered at its top with a cap 55 fastened at cap connection means 51 to (e.g., bolts) to the top of the elongate sleeve 50. In the depicted embodiment, the cap 55 is provided with a top aperture 56 configured to allow passage of the lifting eye 21 vertically fully therethrough when the spud pole 20 is raised to its maximum height. The bottom of the cap 55 preferably includes a pair of stop pads 57, which may be made of a material that preferably has some degree of shock-absorbing capacity but does not deform significantly, such as one-inch-thick ultra-high molecular weight polyethylene, for cushioning the impact of the top of the piston 25 when the spud pole 20 reaches its highest extent within the elongate sleeve 50.

Referring to FIGS. 7, 12, 13, and 15-18, the cap 55 in the depicted embodiment is further configured to include a lock 58. The cap 55 is configured so that when the spud pole 20 is lifted to its maximum height, the locking abutment 22 passes into the top aperture 56 and is aligned to be engaged securely by the lock 58 at the top of the elongate sleeve 50. In the depicted embodiment, the cap 55 also includes a proximity sensor 60 (e.g., an Automation Direct inductive proximity sensor model KSM-AP-4H) and a proximity switch 61, the proximity sensor 60 being configured so that when the spud pole 20 reaches its highest extent in the elongate sleeve 50, the locking abutment 22 reaches a position where it is sensed by the proximity sensor 60. The proximity sensor 60 is connected to the proximity switch 61 (e.g., a McMaster Carr 7674K814 3-wire direct current metallic-object proximity switch), and when the proximity sensor 60 senses the locking abutment 22, it triggers the proximity switch 61. The proximity switch 61 is in turn connected to a pair of pneumatically-actuated rams 59 (e.g., Bimba model SSFO-041.375-3FCFTEE0.25), so that when the proximity switch 61 is triggered, the pneumatically-actuated rams 59 are actuated and driven inwardly against the locking abutment 22, securely holding the spud pole 20 at its highest position within the elongate sleeve 50. The pneumatically-actuated rams 59 preferably may be fitted with a pair of clamp blocks **59*a* (made, e.g., of ultra-high molecular weight polyethylene) that are formed with inner faces formed to fit securely against the locking abutment 22. A variety of other means for locking the spud pole 20 in place vertically can be employed with the present invention, however, and at other possible locations than the top of the hydraulic piston spud pole 10—for example, an insertable/removable lateral crossbar could instead be provided through the bottom aperture 63 (and just below the anchor end face 39 when the spud pole 20 is at its maximum height). The means for locking the spud pole 20 in place vertically also need not include automatically-acting components and instead may be partly or fully manual, and thus need not include the proximity sensor 60 and proximity switch 61. And likewise, suitable locking means may employ various other types of lock mechanisms instead of pneumatically-actuated rams 59, such as the crossbar just noted, screws, wedge mechanisms, gravity locks, etc. The lifting eye 21—which is configured to permit manual lifting (e.g., by crane, after removal of the cap 55 from the elongate sleeve 50) of the spud pole 20 for maintenance or emergency removal—also optionally may be engaged by insertion of a pin (e.g., one-inch diameter, not shown) therethrough, for added backup security to the lock 58** such as during cruising in rough waters.

In embodiments such as the one illustrated, a hydraulic column 40 is defined between the vertically-extending outer surface 24 of the spud pole 20, the vertically-extending inner surface 54 of the elongate sleeve 50, the piston 25, and the sleeve bearing 65, with the hydraulic inlet 45 being located far enough down on the elongate sleeve 50 so that it always remains in communication with the thus-defined hydraulic column 40 including when the spud pole 20 has been dropped to its lowest extent. Other configurations of hydraulic columns are within the scope of the invention, however, such as noted in paragraph below. Pressure in the hydraulic column 40 of the present invention is used to move the spud pole 20 vertically (meaning along the elongate axis of the elongate sleeve 50).

Figure 6:
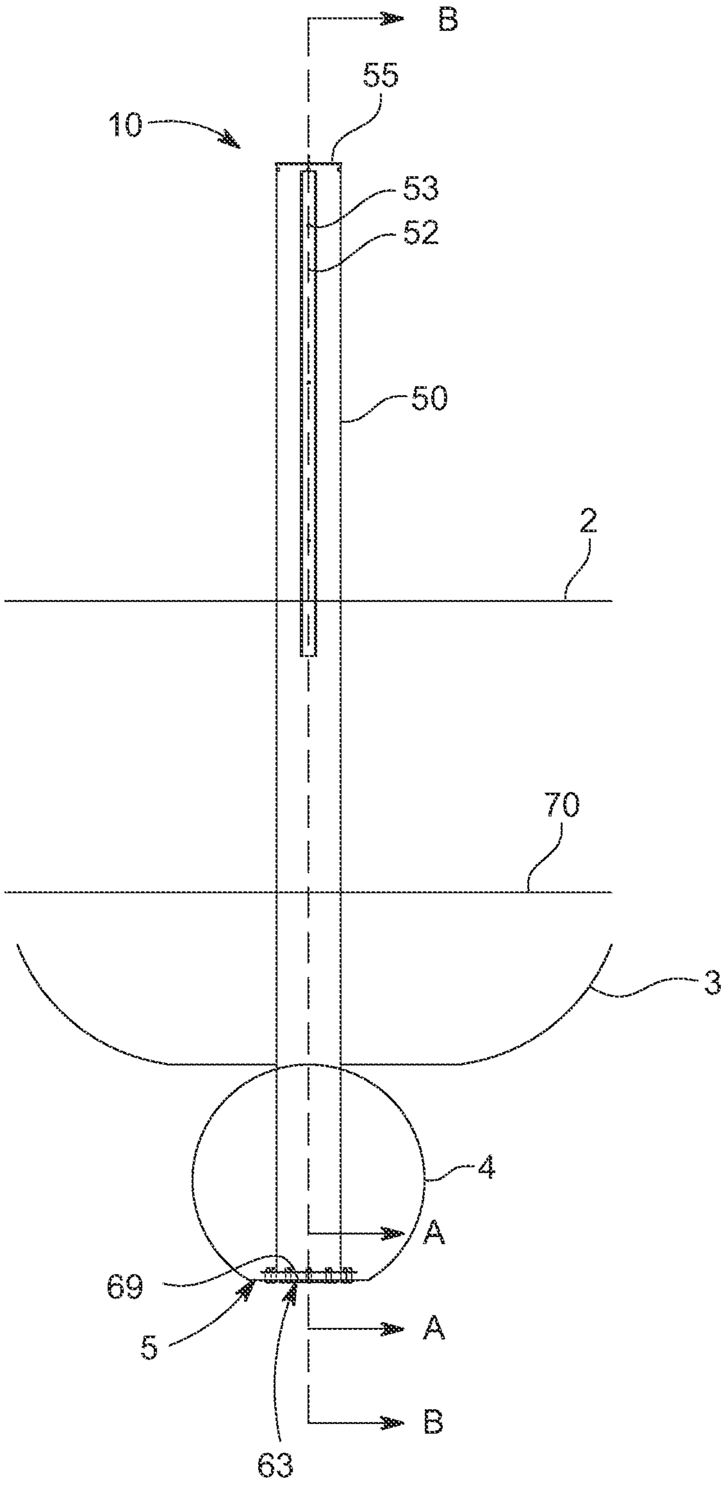
FIG. 6 is a front view of the hydraulic piston spud pole of FIG. 1, with parts of the vessel through which the hydraulic piston spud pole is mounted partially shown.
Figure 7:
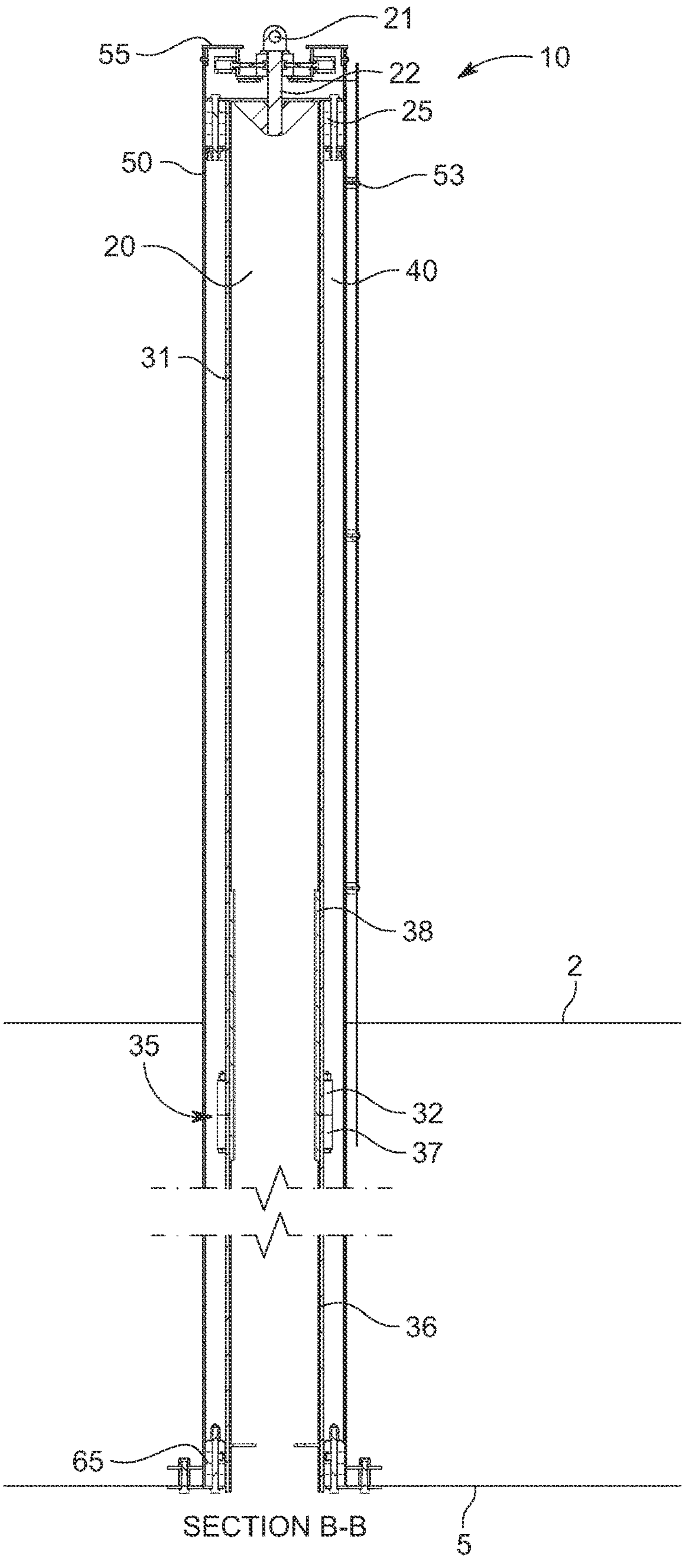
FIG. 7 is a sectional view taken through lines B-B of FIG. 6.

As the moving seal between the spud pole 20's piston outer surface 26 and the vertically-extending inner surface 54 of the elongate sleeve 50 may not be perfectly watertight at all times, high pressure in the hydraulic column 40 may cause some amount of water 7 to escape the hydraulic column 40 and exit out therefrom above the piston 25. Therefore, a means for receiving and routing away from the vessel 1 overflow escaped out of the hydraulic column 40 preferably can be provided such as with a hydraulic overflow outlet 46 defined through the elongate sleeve 50 near its top and a plumbing and breather channel 52 (seen front-on in FIG. 6, and may be formed of 12 GA 316 stainless steel sheet) attached to the elongate sleeve 50 (at channel connection means 53, which may comprise interference fitting nubs and corresponding apertures as depicted) and configured to route escaped water 7 away from the vessel (or, e.g., through a check valve back into the pump inlet line 74, not shown).

Figure 3:
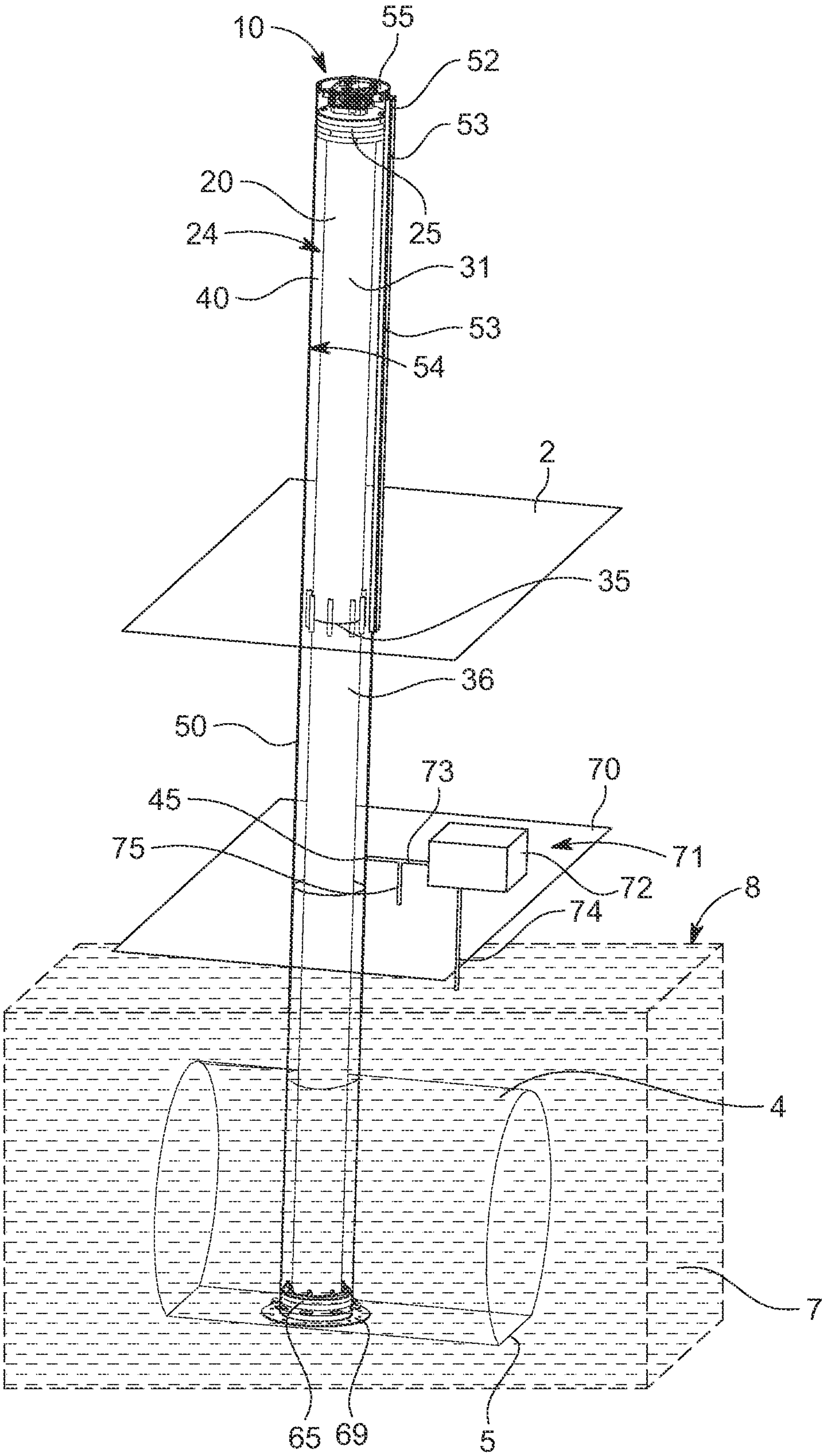
FIG. 3 is a perspective view of a hydraulic piston spud pole of FIG. 1 with parts of the vessel through which the hydraulic piston spud pole is mounted partially shown, with the spud pole fully raised.
Figure 11:
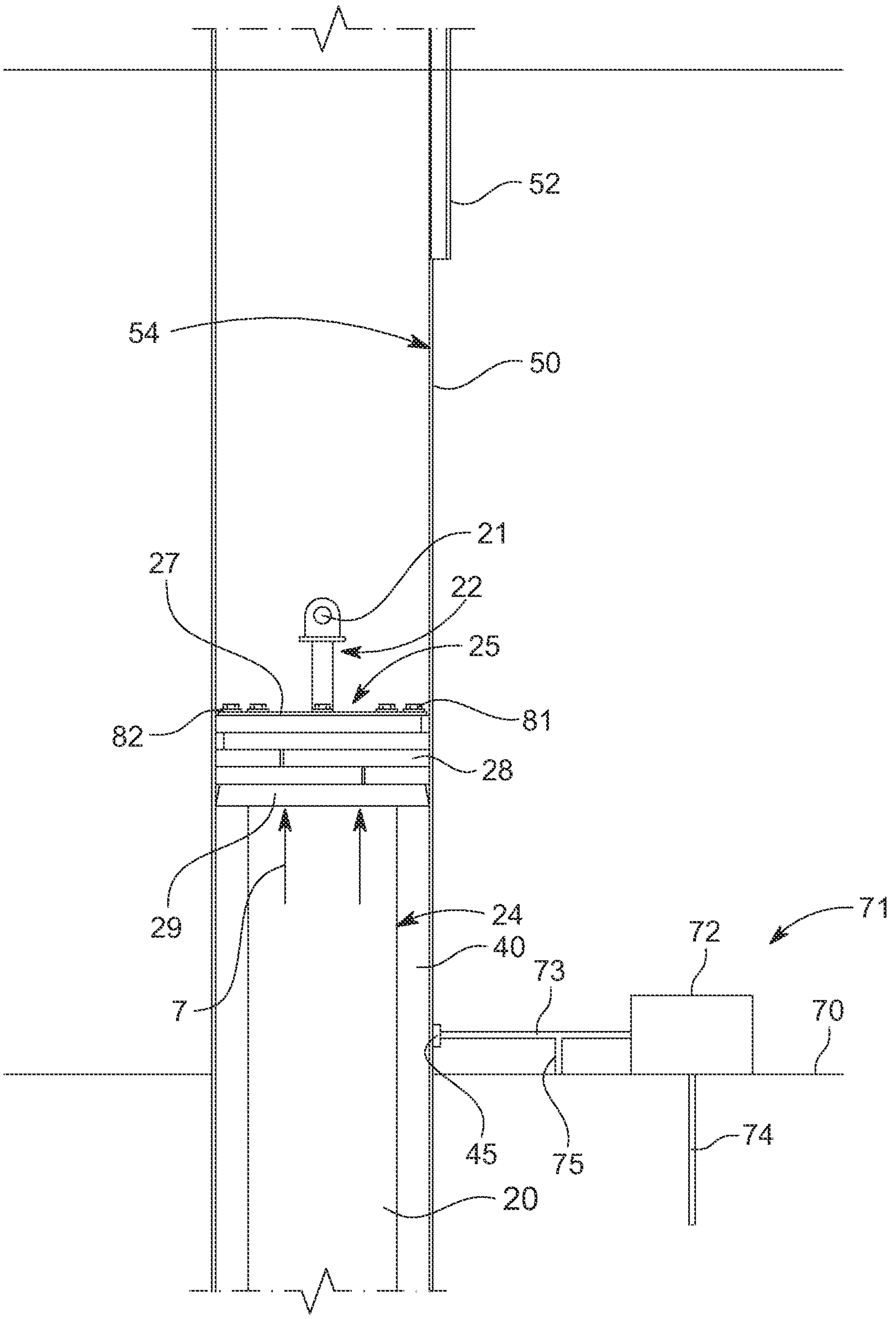
FIG. 11 is a partial side view showing the pump assembly driving the spud pole and its piston upwardly within the elongate sleeve.
Figure 12:
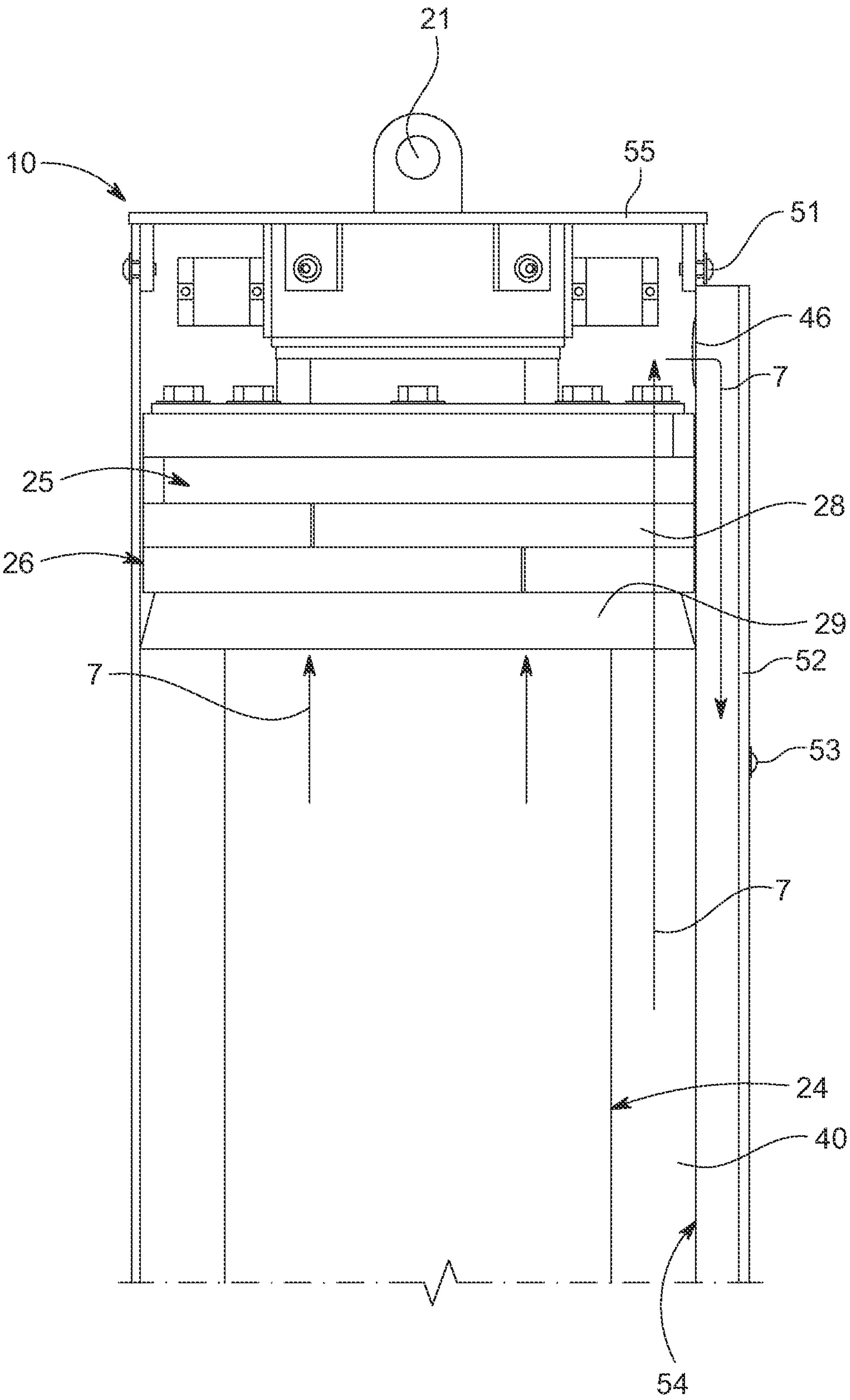
FIG. 12 is a partial side view showing the spud pole and its piston at its maximum upward extent within the elongate sleeve, with the two leftmost arrows indicating hydraulic pressure and the two rightmost arrows indicating the passage of water overflowing out of the hydraulic column and out through the hydraulic overflow outlet and the plumbing and breather channel.

Referring to FIG. 11, the vertical position of the spud pole 20 relative to the vessel 1, its forward deck 2, the bottom 5 of the keel, and the waterline 8 is controlled by hydraulic pressure in the hydraulic column 40, with the hydraulic piston spud pole 10 hooked in parallel to a pump assembly 71 including a pump 72 mounted on a pump compartment floor 70 (shown, inter alia, in FIG. 3). For the exemplary hydraulic piston spud pole 10, the pump 72 may suitably comprise a three-horsepower, thirty pound-per-square-inch, fifty gallon-per-minute, 1.5-inch, single-stage, centrifugal pump of the type used in firefighting or water extraction, fed by a pump inlet line 74, and communicating with the hydraulic column 40 via a pump outlet line 73 connected to the hydraulic inlet 45, with a drain line 75 to discharge water 7 when the spud pole 20 descends. In the depicted embodiment, the pump outlet line 73, pump inlet line 74, and drain line 75 preferably may each have an inner diameter that is somewhat oversized, e.g., two inches, compared to the pump 72's 1.5 inches. The pump inlet line 74 (and preferably also the drain line 75) is run to a source of water 7 (e.g., a lake or ocean), preferably with a filter (not shown) to prevent intrusion of contaminants into hydraulic piston spud pole 10 and its hydraulic column 40.

Figure 18:
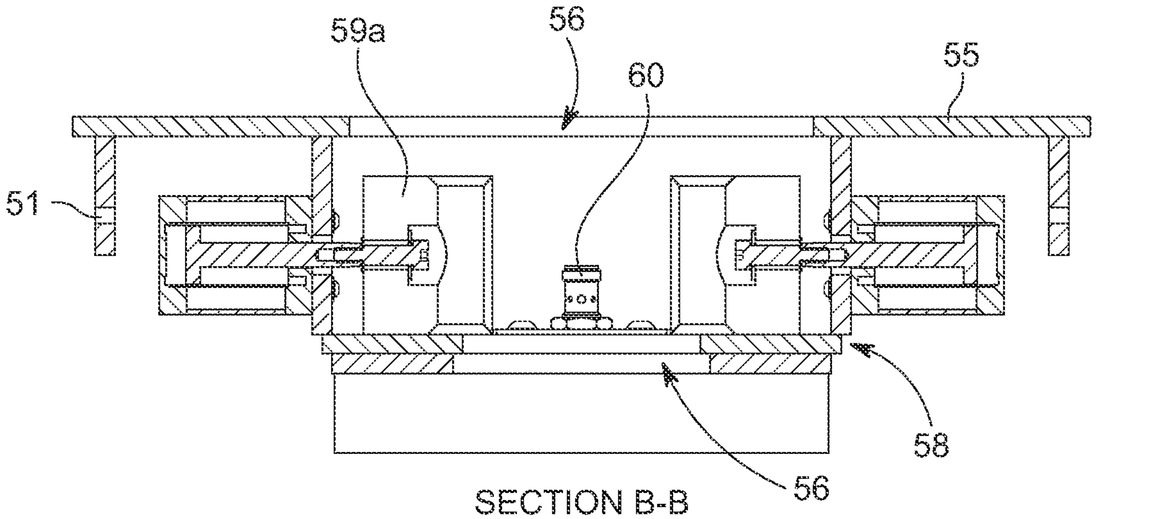
FIG. 18 is a sectional view like that of FIG. 17, but showing the lock in a disengaged position.

Pumping water 7 into the hydraulic column 40 defined between the spud pole 20 and the elongate sleeve 50 in the exemplary embodiment (e.g., at about twenty pounds per square inch) drives the spud pole 20 upwardly toward the cap 55 of the elongate sleeve 50, where the spud pole 20's locking abutment 22 can be engaged securely by the cap 55's lock 58 (as seen in FIG. 18). To accomplish this in an exemplary embodiment, the pump 72 preferably is purged of air via the (opened) drain line 75, whereupon (with the pump 72 running) the pump outlet line 73 is opened and the drain line 75 is closed; once the spud pole 20 reaches its highest extent and is vertically locked in place (for example, in the depicted embodiment when the proximity sensor 60 senses the locking abutment 22), the drain line 75 preferably is reopened and the pump 72 is turned off (and the pump outlet line 73 preferably is closed).

Figure 9:
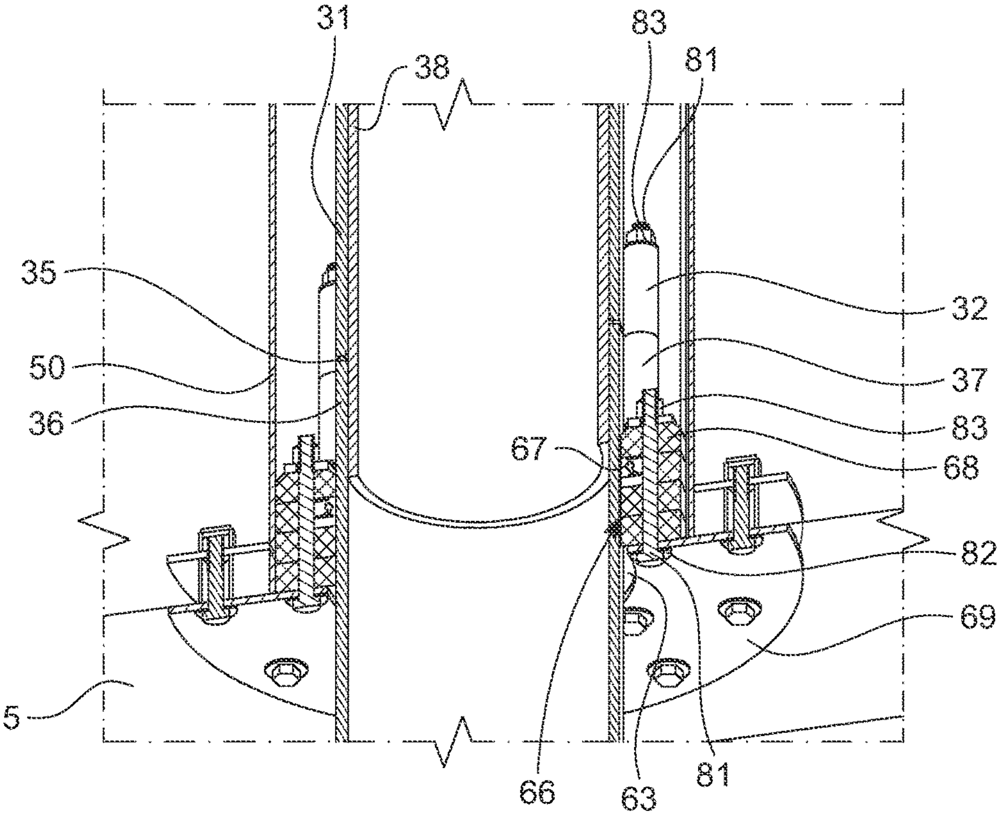
FIG. 9 is a partial cutaway perspective view showing the breakaway joint of the spud pole and the sleeve bearing at the bottom of the elongate sleeve.
Figure 17:
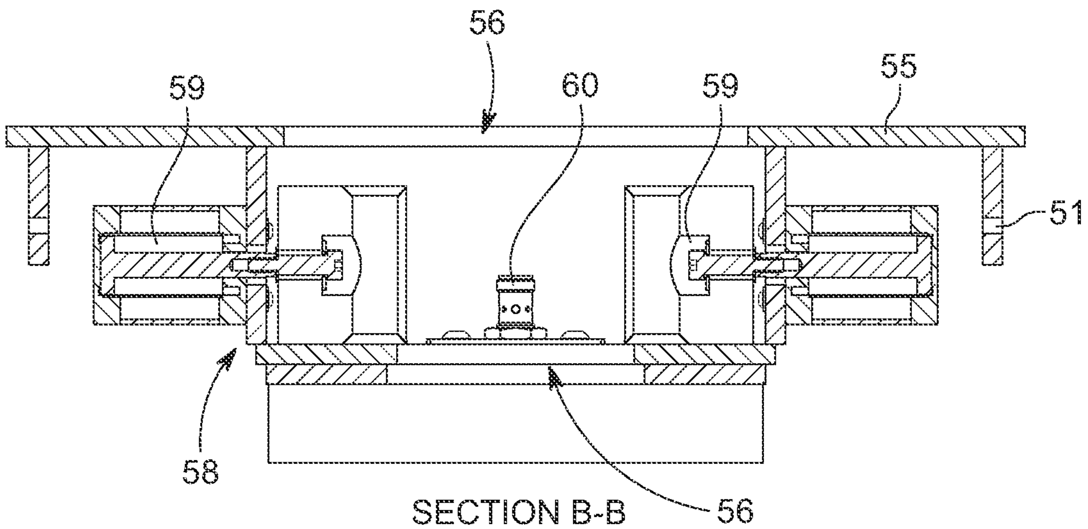
FIG. 17 is a sectional view of the cap taken along lines B-B of FIG. 15, showing the lock in an engaged position.

In an exemplary embodiment of hydraulic piston spud pole 10, to lower the spud pole 20 for anchoring, the pump 72 preferably is purged via the (opened) drain line 75 and then (with the pump 72 running) the pump outlet line 73 is opened and the drain line 75 is closed, whereupon the lock 58 is disengaged (as seen in FIG. 17) and the pump pressure is removed (or lowered). Thus the spud pole 20 is allowed to drop downwardly, preferably at a desired controlled speed (dictated significantly by the resistance of the drain line 75, which in turn depends on its inner diameter and length), until its anchor end face 39 lodges in the seafloor (or lake bottom, etc.) or the bottom of its breakaway joint 35 reaches and is obstructed by the top of the sleeve bearing 65 at the bottom 5 of the keel (as seen in FIG. 9).

Figure 19:
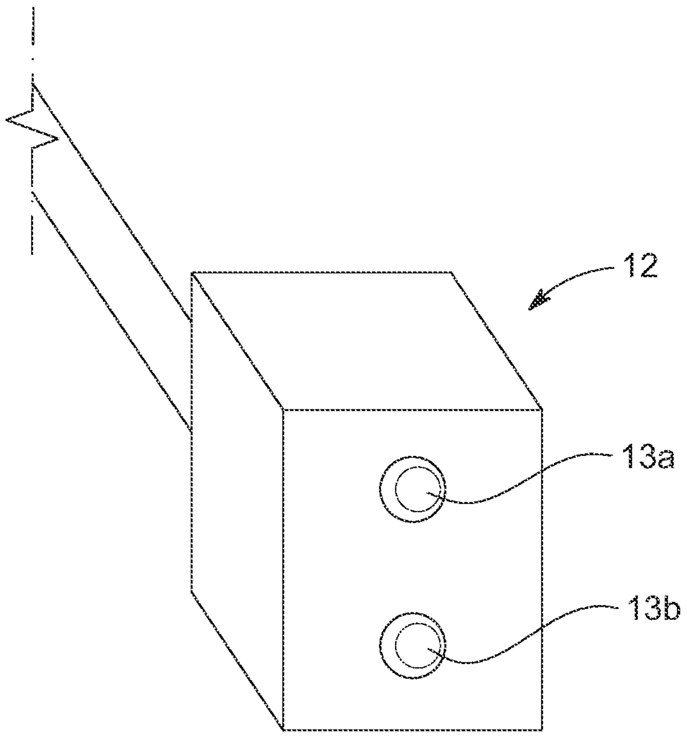
FIG. 19 is a perspective view of a controller for controlling the pump assembly.

As shown in FIG. 19, the hydraulic piston spud pole 10 preferably comprises a controller 12, which preferably includes up and down buttons 13*a* and 13*b* operably connected to the pump assembly 71 (including to the pump 72 to control its operation, and preferably also to one or more of its inlet, outlet, and drain lines) to allow the user to lift and lower the spud pole 20. Optionally, the controller 12 also may be configured (with or without other buttons than the up and down buttons 13*a* and 13*b*) to directly or indirectly (e.g., in conjunction with automatic operation of sensors, switches, etc., such as described in paragraph above) control locking and unlocking of the spud pole 20 in the elongate sleeve 50. The controller 12 preferably may be configured to leave the drain line 75 open while the spud pole 20 is anchored so that the spud pole 20 can "breathe" upwardly and downwardly within the elongate sleeve 50 as waves and tides move the forward deck 2 with respect to the ocean or lake bottom. Various alternative configurations and variations of controllers and additional features also are within the scope of the invention, such as a single-press anchor/weigh-anchor button, hydraulic pressure and/or speed controls, etc.

As an alternative to the depicted hydraulic column 40, the cap 55 and the piston 25 could be configured (not shown) to respectively define the top and bottom of a hydraulic column whereby positive pump pressure would drive the spud pole 20 downwardly rather than upwardly, and negative pump pressure would lift the spud pole 20. Also, in embodiments such as the exemplary one, the pump 72 optionally may be configured to provide reverse flow (suction) to the pump outlet line 73 (or the pump outlet line 73 could be paired with a selectable alternate pump outlet line that communicates with an opposing column as described in the previous sentence), to assist in driving the anchor end face 39 of the spud pole 20 into the bottom for more secure anchoring.

As seen in FIGS. 2-5, 7, and 14, the spud pole 20 optionally may be divided into an upper pole 31 and a lower pole 36 joined together at a breakaway joint 35 comprising mating upper fastening tubes 32 and lower fastening tubes 37 (e.g., three inch by one inch diameter, 0.12 inch wall thickness, 304 stainless steel) that are bolted to each other and are welded to their respective upper or lower pole section. The breakaway joint 35 is configured to permit the spud pole 20 to be separated into two halves and the upper pole 31 lifted upwardly (e.g., by crane) for example in case the spud pole 20 becomes bent, thus facilitating the freeing of the vessel 1 from the hydraulic piston spud pole 10's anchorage to the bottom and abating the exertion of excessive force or torque on the hydraulic piston spud pole 10 that otherwise might cause failure of seals in or around the hydraulic piston spud pole 10. If a breakaway joint 35 is used, an internal bolster 38 preferably may be provided, the internal bolster 38 preferably being sized so as to clearance fit within the spud pole 20 and to extend substantially (e.g., one foot) above and below the breakaway joint 35, and preferably attached fixedly (e.g., welded) to one of, and to clearance fit within the other of, the upper pole 31 and the lower pole 36. Alternatively or in addition to a breakaway joint 35, the hydraulic piston spud pole 10 may be configured to activate an overstress warning system and/or to automatically lift the spud pole 20 in response to a lateral force or torque sensor(s) provided in the hydraulic piston spud pole 10 detecting a lateral force or torque in excess of a predetermined value.

While a vessel 1 may be fitted with more than one hydraulic piston spud pole 10, anchoring with a single hydraulic piston spud pole 10 at the bow can allow the vessel 1's stern (including the vessel 1's main propellers) to pivot, or weathervane, freely with the wind or tide or both. Thus, for example, the vessel 1 can be navigated to and anchored with the hydraulic piston spud pole 10 in the entryway of a tidal pool, where it can then weathervane in response to the current. If the vessel 1 is fitted with a hybrid propulsion system that is configured to generate electricity (e.g., for charging onboard batteries) in response to externally-forced rotation of propellers or the like, this weathervaning can optimize the hybrid propulsion system's ability to generate electricity as the propellers are driven by incoming and outgoing tide to and from the tidal pool, augmenting conventional and/or other means of renewable power generation such as solar and wind and enhancing self-sufficiency and range.

The present specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

What is claimed is:

1. A hydraulic piston spud pole for anchoring a vessel, comprising:

a) an elongate sleeve configured to be affixed to a vessel and having a top, a hydraulic inlet, a bottom terminating in a bottom aperture, and a vertically-extending inner surface having a first inner diameter and provided with a sleeve bearing having a sleeve bearing inner surface having a second inner diameter that is narrower than the first inner diameter;

b) a spud pole vertically-movably seated within the elongate sleeve and having a vertically-extending outer surface configured to fit closely against the sleeve bearing inner surface, and having a piston with a piston outer surface configured to fit closely against the vertically-extending inner surface of the elongate sleeve, wherein a hydraulic column communicating with the hydraulic inlet of the elongate sleeve is at least partly defined between the vertically-extending outer surface of the spud pole and the vertically-extending inner surface of the elongate sleeve; and c) a pump assembly comprising a pump, a pump inlet line connecting the pump to a source of water, and a pump outlet line connecting the pump to the hydraulic inlet.

2. The hydraulic piston spud pole of claim 1, wherein the hydraulic column is further defined between the piston and the sleeve bearing.

3. The hydraulic piston spud pole of claim 1, wherein the hydraulic piston spud pole is sized for use in anchoring a vessel having a displacement in excess of fifteen tons, and wherein one or both of the piston outer surface and the sleeve bearing inner surface comprise a high-impact polymer.

4. The hydraulic piston spud pole of claim 3, wherein the high-impact polymer comprises ultra-high molecular weight polyethylene.

5. The hydraulic piston spud pole of claim 1, wherein the hydraulic piston spud pole is integrally mounted to the vessel, and the spud pole and the elongate sleeve are configured so that the spud pole can rotate within the elongate sleeve when the vessel is anchored via the hydraulic piston spud pole.

6. The hydraulic piston spud pole of claim 5, wherein the hydraulic piston spud pole is mounted forward and amidships in the vessel.

7. The hydraulic piston spud pole of claim 1, further comprising a controller operably connected to the pump assembly.

8. The hydraulic piston spud pole of claim 1, further comprising a lock and a locking abutment configured to engage each other so as to prevent the spud pole from moving vertically.

9. The hydraulic piston spud pole of claim 8, wherein the top of the elongate sleeve is provided with a cap and the lock is provided in the cap.

10. The hydraulic piston spud pole of claim 8, wherein the lock is at least partly automatic and comprises a proximity sensor, a proximity switch, and one or more pneumatically-actuated rams connected to the proximity switch and configured to mate with the locking abutment.

11. The hydraulic piston spud pole of claim 1, wherein the elongate sleeve further comprises a hydraulic overflow outlet.

12. The hydraulic piston spud pole of claim 11, wherein the elongate sleeve further comprises a means for receiving and routing away from the vessel overflow escaped out of the hydraulic column, the means for receiving and routing being connected to the hydraulic overflow outlet.

13. The hydraulic piston spud pole of claim 1, wherein the spud pole further comprises a breakaway joint.

14. The hydraulic piston spud pole of claim 1, wherein the pump assembly further comprises a drain line 75.

15. The hydraulic piston spud pole of claim 1, wherein the elongate sleeve is connected to a vessel having a forward deck, and wherein a substantial portion of the elongate sleeve extends above the forward deck and is structurally strong enough to support additional structures of the vessel.

16. A hydraulic piston spud pole for anchoring a vessel, comprising:

a) an elongate sleeve configured to be affixed to a vessel and having a top, a hydraulic inlet, and a bottom terminating in a bottom aperture, at least a portion of the elongate sleeve including the hydraulic inlet being formed to contain a hydraulic column;

b) a spud pole having a piston and vertically-movably seated within the elongate sleeve;

c) a pump assembly comprising a pump, a pump inlet line connecting the pump to a source of water, and a pump outlet line connecting the pump to the hydraulic inlet; and d) means for controlling the pump assembly to selectively cause lifting and dropping of the spud pole.

17. The hydraulic piston spud pole of claim 16, wherein the elongate sleeve comprises a vertically-extending inner surface having a first inner diameter and is provided with a sleeve bearing having a sleeve bearing inner surface having a second inner diameter that is narrower than the first inner diameter, and wherein the spud pole has a vertically-extending outer surface configured to fit closely against the sleeve bearing inner surface and the piston has a piston outer surface configured to fit closely against the vertically-extending inner surface of the elongate sleeve.

18. The hydraulic piston spud pole of claim 17, wherein the hydraulic column is defined between the vertically-extending outer surface of the spud pole, the vertically-extending inner surface of the elongate sleeve, the piston, and the sleeve bearing.

19. The hydraulic piston spud pole of claim 17, wherein the hydraulic piston spud pole is sized for use in anchoring a vessel having a displacement in excess of fifteen tons, and wherein one or both of the piston outer surface and the sleeve bearing inner surface comprise a high-impact polymer.

20. The hydraulic piston spud pole of claim 19, wherein the high-impact polymer comprises ultra-high molecular weight polyethylene.

21. The hydraulic piston spud pole of claim 16, wherein the hydraulic piston spud pole is integrally mounted to the vessel, and the spud pole and the elongate sleeve are configured so that the spud pole can rotate within the elongate sleeve when the vessel is anchored via the hydraulic piston spud pole.

22. The hydraulic piston spud pole of claim 21, wherein the hydraulic piston spud pole is mounted forward and amidships in the vessel.

23. The hydraulic piston spud pole of claim 16, further comprising means for selectively locking the spud pole so as to prevent it from moving vertically.

24. The hydraulic piston spud pole of claim 23, wherein the means for selectively locking the spud pole is automatic and includes a proximity sensor.

25. The hydraulic piston spud pole of claim 16, wherein the elongate sleeve further comprises means for receiving and routing away from the vessel overflow escaped out of the hydraulic column.

* * * * *